United States Patent [19]

Theus

[11] Patent Number: 4,779,089
[45] Date of Patent: Oct. 18, 1988

[54] BUS ARBITRATION CONTROLLER

[75] Inventor: John G. Theus, Portland, Oreg.

[73] Assignee: Tektronix, Inc., Beaverton, Oreg.

[21] Appl. No.: 158,101

[22] Filed: Feb. 16, 1988

Related U.S. Application Data

[63] Continuation of Ser. No. 802,506, Nov. 27, 1985, abandoned.

[51] Int. Cl.[4] .................. H04Q 5/00; H04Q 1/18; H04J 3/02
[52] U.S. Cl. .................. 340/825.5; 370/85; 364/200
[58] Field of Search ........... 340/825.5, 825.51, 825.05, 340/825.83; 370/85, 93; 364/200

[56] References Cited

U.S. PATENT DOCUMENTS

| | | | |
|---|---|---|---|
| 3,710,351 | 1/1973 | Nakamura | 364/200 |
| 3,796,992 | 3/1974 | Nakamura et al. | 370/85 |
| 3,818,452 | 6/1974 | Greer | 340/825.83 |
| 4,096,569 | 6/1978 | Barlow | 364/200 |
| 4,359,731 | 11/1982 | Beauford et al. | 340/825.51 |
| 4,423,384 | 12/1983 | De Bock | 340/825.51 |
| 4,468,738 | 8/1984 | Hansen et al. | 364/200 |
| 4,570,162 | 2/1986 | Boulton et al. | 340/825.5 |
| 4,593,282 | 6/1986 | Acampora et al. | 340/825.51 |

FOREIGN PATENT DOCUMENTS 0032864 7/1981 European Pat. Off. ....... 340/825.51

OTHER PUBLICATIONS

"VME Bus Requestor Releases But Four Ways", Electrical Design News, vol. 30, No. 18, Aug. 1985, Wade Peterson, pp. 241 and 242.
"Futurebus Anticipates Coming Needs", Electronics International, vol. 57, No. 14, Jul. 1984, John Theus et al., pp. 108-112.
"Arbitration and Control Acquisition in the Proposed IEEE 896 Futurebus", IEEE Micro, vol. 4, No. 4, Aug. 1984, D. M. Taub, pp. 28-41.

Primary Examiner—Robert L. Griffin
Assistant Examiner—Ralph E. Smith
Attorney, Agent, or Firm—John P. Dellett; Robert S. Hulse

[57] ABSTRACT

A bus arbitration controller controls access of a plurality of asynchronous potential master devices to a unitary interconnecting bus by forming a distributed state machine of arbitration logic units in each of the potential master devices. Each arbitration logic unit receives control signals by way of the unitary bus which are common to all the devices, each control signal being the logical OR of the corresponding signals from all other devices. The control signals include a device address/priority number and a synchronization signal set. The arbitration logic includes a priority resolver which awards bus access to a device having the highest address/priority number, and control logic which receives the common synchronization signal set and synchronizes the operation of the device in which the arbitration logic resides with all other devices contending for the unitary bus. The control logic and the priority resolver are programmable array logic circuits.

3 Claims, 3 Drawing Sheets

BUS ARBITRATION CONTROLLER

This is a continuation of application Ser. No. 802,506 filed Nov. 27, 1985 and now abandoned.

BACKGROUND OF THE INVENTION

The invention relates to computer systems, and more particularly to apparatus for arbitrating among a plurality of asynchronous potential master devices contending for access to a computer bus.

The proliferation of microprocessors has produced the economic incentive and consequent trend to construct multimicroprocessor computer systems, where previous implementations used one high-performance processor. There is an attendant need for a bus system through which the microprocessors, and associated data storage modules and peripheral devices can be interconnected. The purpose of any bus structure is to allow devices connected to it to transfer data from one device to another. First, however, the device initiating a data transfer must gain control of the bus. Typically, control will be delegated to any device that requests the bus to establish a communication path between itself and another device connected to the bus. It is possible that two or more devices may attempt to do this at the same ime, i.e., contention may occur. Accordingly, there must be means for deciding which device will first access the bus. The process of making the decision is termed arbitration, and the process is performed by a bus arbitration unit.

A variety of devices may be interconnected by way of a common unitary bus, the devices including processors, data stores and peripheral devices having various operating speeds. In a unitary-bus system, devices other than a central processing unit can gain control of the bus. The device in control of the bus is called a "master", and those devices with which the bus master communicates, are termed "slaves." In a bus protocol such as the Institute of Electrical and Electronic Engineers IEEE 896 Futurebus, each potential master is provided with bus arbitration logic receiving bus access control signals from the master including a unique priority number, and inputs from control lines of the bus indicating activity of other devices connected to the bus including their priority numbers and bus access request signals. The bus arbitration unit, comprising the collective bus arbitration logic in all potential master devices, resolves the bus request contention and assigns the bus to a specific device, permitting that device to become the bus master. Data exchange transactions are established between the bus master and a slave device in a step-by-step manner, utilizing an asynchronous, handshaking process. The master (or slave) device is not permitted to continue dialog with another device until a reply has been received from the slave (or master) device, the timing of each reply being determined by the response characteristics of the devices involved and not by a system clock. Such an asynchronous communication mode allows a system to be technology independent. In a system having abus arbitration controller comprised of logic distributed in the modular devices of the system, it is advantageous to implement the distributed logic inexpensively, in compact microcircuits.

It is an object of the invention to provide an improved bus arbitration controller in a multidevice modular data processing system.

Another object of the invention is to provide an improved bus arbitration controller which is distributed among the controlled devices.

Another object of the invention is to provide new and improved apparatus for implementing a distributed logic bus arbitration controller characterized by inexpensive fabrication of the arbitration units in microcircuit packages.

Another object of the invention is to provide an improved bus arbitration controller which synchronizes the operation of a plurality of asynchronous devices connected to the bus.

Still another object of the invention is to provide an improved bus arbitration controller suitable for use with fault-tolerant systems.

SUMMARY OF THE INVENTION

The present invention provides a bus arbitration controller which includes arbitration logic in each potential master device connected to an IEEE 896 standard computer bus for performing an asynchronous arbitration protocol. Each arbitration logic unit comprises programmable array logic circuits receiving input control signals from the associated potential master device and signals from all other potential master devices by way of control lines of the bus common to all the devices, and generates signals to resolve contention among the devices connected to the bus and award bus mastership to the device having priority in accordance with a predetermined priority assignment of the devices. The arbitration logic includes a priority resolver and control logic. The control logic, enabled by a bus request from the associated potential master device, performs the protocol in concert with the other potential master devices on the bus by using RS bistables to implement an asynchronous state machine which, at the appropriate time in the protocol, enbables the priority resolver and waits a predetermined time for the resolver to settle. The resolver uses combinatorial logic in a programmable array logic circuit to select the highest priority potential master device. All devices participating in the arbitration are synchronized with one another such that no device can start a new operation in the procedure until all devices have completed the present operation.

While the invention is set forth with particularity in the appended claims, other objects, features, the organization and method of operation of the invention will become more apparent, and the invention will best be understood by referring to the following detailed description in conjunction with the accompanying drawings in which:

DESCRIPTION OF THE PREFERRED EMBODIMENT

Figure 1:
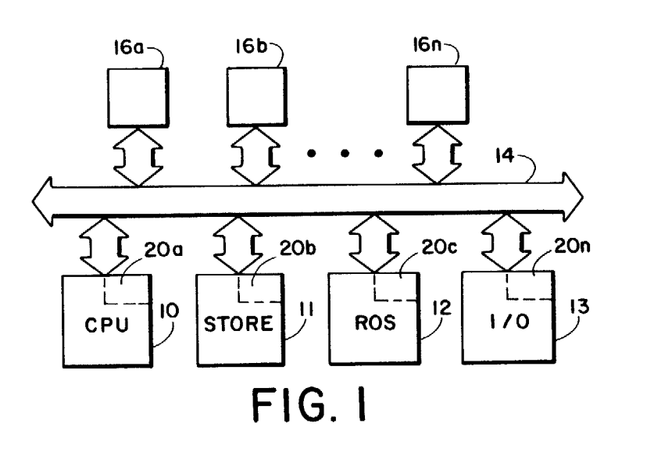
FIG. 1 is a block diagram of a multidevice computer system having a unitary bus.

Referring now to the drawing for a more detailed description of the construction, operation and other features of the invention by characters of reference, FIG. 1 illustrates a data processing system having a central processing unit 10, a data store module 11, a read-only store 12, and an input/output device 13, all connected to a unitary bus 14, which provides a communication path between the various units 10-13 of the system in a manner well known in the art. The purpose of the bus 14 is to allow devices 10-13 connected to it to transfer data from one device to another. First, however, one of the devices having a need to transfer data must gain control of the bus. Any one of the devices 10-13 can gain control of the bus 14, and the device granted such control is called a "master", while those devices with which the bus master communicates, are termed "slaves." A plurality of devices 16a, b, ... n that can function only as slaves are also connected to the bus 14. Devices connected to the bus 14 are thus divided into two categories, viz.: potential masters (PMs), devices 10-13 which must gain control of the bus 14 to initiate data transfers; and the remaining devices 16a-n, which can only act as slaves. The potential master devices 10-13 are further divided into two classes: (1) priority devices which require fragment or urgent access to the bus, for example to process real-time operations; and (2) fairness devices which require less urgent access to the bus 14.

It is possible that two or more potentialmaster devices may attempt to gain control of the bus 14 at the same time, i.e., contention may occur; therefore, there must be means for deciding which device will be granted access the bus 14. The process of making the decision is termed arbitration, and the proces is performed by a bus arbitration unit 20, which is not a centralized unit, but is distributed among all the devices connected to the bus 14. Each of the devices 10-13, respectively, includes bus arbitration logic 20a, b, c, ... n, which collectively form the bus arbitration unit 20. During the arbitration process, a priority-class device always wins access to the bus 14 over a fairness-class device.

Figure 2:
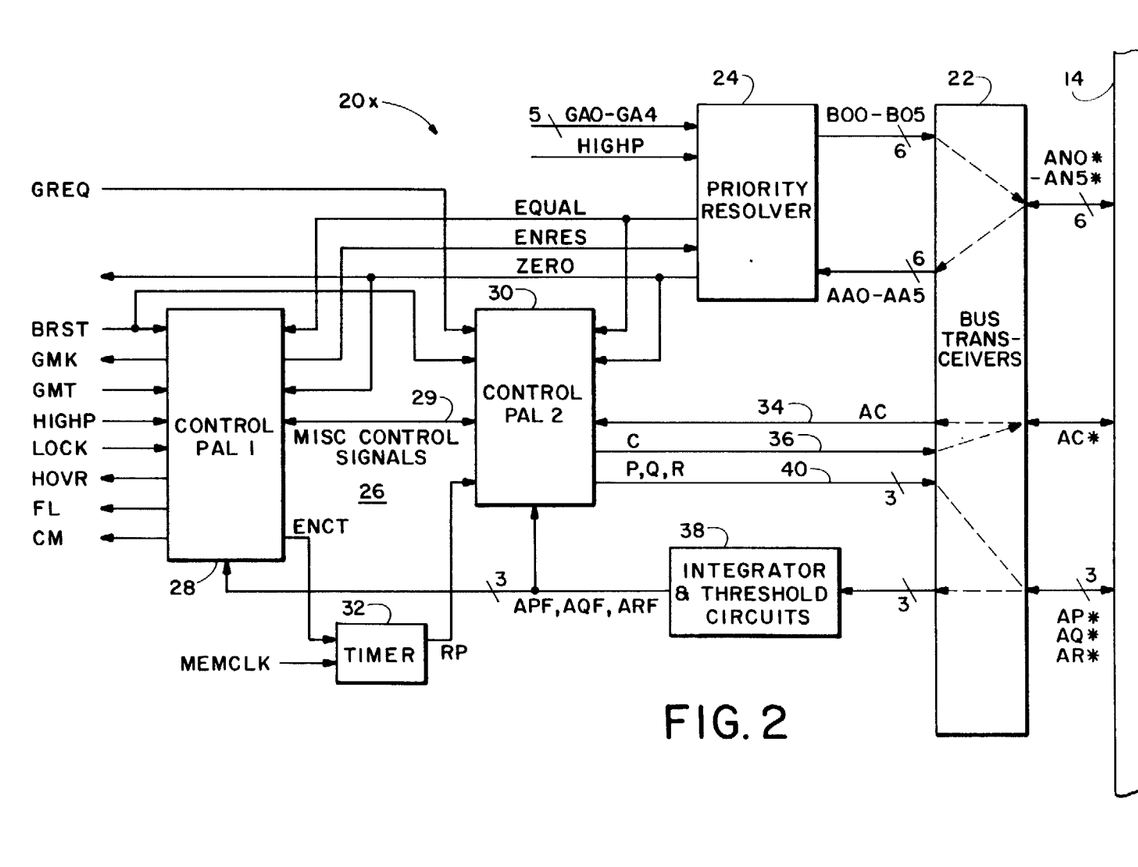
FIG. 2 is a schematic block diagram of arbitration logic in accordance with the instant invention.

Referring to FIG. 2, representative bus arbitration logic 20x is shown in greater detail. Each device which is connected to the bus 14, and is a potential master, includes bus arbitration logic as shown in FIG. 2. The circuits depicted in FIG. 2 compete with like circuits in all other devices to determine which device will acquire access to the bus 14 as a bus master. The following discussion of the bus arbitration logic 20x applies generally to logic in each device connected to the bus 14; however, to differentiate between the particular device illustrated, and other devices having similar bus arbitration logic, the illustrated device is referred to as the "instant" device. All PM devices participate in every arbitration operation, even though a particular device may not require immediate access to the bus 14. The arbitration process is asynchronous wherein each PM device participates in a state machine that is distributed throughout all the PM devices on the bus 14. The distributed configuration ensues that each transition from state-to-state is agreed upon by each individual potential-master device.

The bus 14 interface signal leads utilize negative logic, i.e., a less-positive level on the signal lead of the bus 14 represents a logic 1. The voltage level of each such lead represents the OR function of the signals applied to it by the various PM devices connected to the bus. In accordance with standard practice, the logic-signal names of the bus leads are designated with an asterisk (*) to indicate that binary 1 is represented by the less-positive level. Logic levels of the signals of the bus arbitration logic are conventional positive logic.

Each of a plurality of interface signal leads ANO*-AN5*, AC*, AP*, AQ*, AR* of the bus 14 is connected to each PM device along the bus through a bus transceiver 22 in a well-known open-collector output arrangement, wherein each lead carries a signal representing the OR function of the signals applied to the lead by the various PM devices. The ANO*-AN5* signals represent an arbitration number. Each competing device on the bus 14 asserts an internally generated, predetermined arbitration number on the ANO*-AN5* signal leads, and when the arbitration cycle ends, the highest priority arbitration number remains on the leads. The AN5* signal, which indicates if a device is in the priority or fairness class, is enabled by priority-class devices in response to a HIGHP signal asserted by the device, and disabled by fairness-class devices.

The bus arbitration logic 20x comprises a priority resolver 24, and control logic 26 including first and second programmable array logic (PAL) circuits 28, 30, and a timer circuit 32. The timer circuit 32 comprises a four-bit counter receiving a timing signal MEMCLK generated by the device, and a control signal ENCT which enables the counter. After counting a predetermined number of the MEMCLK pulses, the timer circuit 32 generates a control signal RP indicating to the control logic 26 an end of an arbitration delay time or period. The priority resolver 24 receives a signal set GA0-GA4, representing a predetermined arbitration number unique to the particular device in which the bus arbitration logic 20x resides. The arbitration number determines a device's priority within the arbitration class. The HIGHP signal designates the device as a priority class device, and when high, enables the priority arbitration mode in the resolver 24.

The AC* (arbitration condition) signal lead of the bus 14 is asserted by a device to signal other devices on the bus 14 that bus access is needed by the device. An AC* signal received by the bus artitration logic 20x is regenerated in the bus transceivers 22 as an AC signal and applied via lead 34 to the control logic 26. Devices requiring bus 14 access generate, in the control logic 26, a signal, C, on lead 36, which is applied to the driver of the bus transceiver 22 corresponding with the AC* lead of the bus 14. The AC* interface lead serves a dual purpose: during arbitration the line serves as a general condition or status line indicating the existence of an error condition if enabled; when no arbitration procedure is in progress the AC* line is used for signaling a bus request.

The AP*, AQ*, and AR* interface leads of the bus 14 are coupled by way of integrator and threshold circuits 38 to the PALs 28, 30 of the control logic 26, respectively, as signals APF, AQF, and ARF on a bus 29. The AP*, AQ*, and AR* signals, which comprise a synchronization signal set, are used to define a distributed state machine among the devices on the bus 14 participating in arbitration, and indicate a state of the operation which is currently valid, thereby performing a handshake operation among the asynchronous devices and maintaining synchronization of the the devices during the arbitration process. Corresponding device signals P, Q, and R are asserted by the PAL 30 and coupled by way of bus 40 and bus transceivers 22, respectively, to the AP*, AQ*, and AR* interface leads under control or logic 26.

Figure 3:
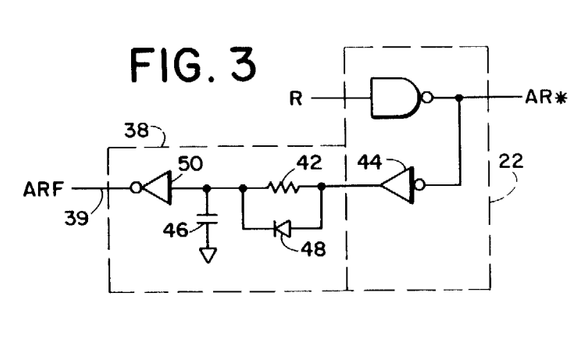
FIG. 3 is a schematic diagram of a circuit of FIG. 2.

The integrator and threshold circuits 38 solve a problem that occurs in wired-OR lines. If two or more devices are holding a bus line at binary 1 and one of the lines switches to binary 0, the redistribution of current in the line can cause a spurious pulse to appear on the line. This pulse, popularly known as a wired-OR glitch, can cause devices to misinterpret the state of the line as representing 0, although other devices are still applying 1. The effect of wired-OR glitches is overcome by including, in each line, an integrator and threshold circuit designed so that the longest possible glitch or series of glitches will not cause the output to switch erroneously. Referring to FIG. 3, a representative one of the integrator and threshold circuits 38 is shown on the AR* bus line comprising a resistor 42 connected to a bus receiver 44 of the bus transceivers 22, the bus receiver 44 having an input connected to the AAR* bus line. A capacitor 46 to ground and the resistor 42 form an integrator circuit in the AR* line. A diode 48 provides a path for recharging the capacitor 46. The diode/resistor/capacitor 48/42/46 network filters pulses having widths of 25 nanoseconds or less, which is the presently described embodiment of the invention, is less than twice the propagation delay of the bus. An inverter 50 serves as a logic-level regenerating circuit which prevents regeneration of the spurious pulses as a change in logic level; the AR* signal is regenerated as the ARF signal on the bus 39. The inverter 50 functions as a threshold circuit which provides a consistent and extremely tight threshold voltage (1.55±0.05 volts in the present embodiment) to reject anomalous logic levels generated by the filter in response to spurious pulses on the AR* line. For additional information regarding the phenomenon of wired-OR glitches, see D. B. Gustavson and J. Theus, "Wire-OR Logic on Transmission Lines," IEEE Micro, Vol. 3, No. 3, June 1983, pp. 51-55.

Input signals to the control logic 26 are named and a brief description of the function of each signal is listed as follows:

GREQ—Bus Request signal—This signal, asserted by the device, is enabled to request bus mastership for the device.

BRST—Board Reset—Resets control bistables of the control logic 26.

GMT—Bus Mastership Terminate/Done. Asserted by the instant device, this signal, when enabled, indicates that the instant device will release mastership of the bus.

HIGHP—High Priority—Enabled by the instant device, this signal, when enabled, enables the priority arbitration mode.

Lock—A current master device asserts this signal to force an arbitration cycle with a zero arbitration number for the purpose of cancelling locking operations in slave devices.

MEMCLK—Memory Clock—Clock signal input from the instant device to the timer 32 for timing the operation of the priority resolver 24.

The control logic 26 comprises a plurality of RS bistable logic elements connected to perform a process or protocol of arbitration and control acquisition of a device connected to a unitary bus shared and in contention with other devices on the bus. The control logic 26 is implemented in the PALs 28, 30 which function together as a single controller. Output and internal signals labeled MISC CONTROL SIGNALS on the bus 29 between the PALs 28, 30 are listed and defined as follows. A double asterisk (**) adjacent the signal indicates the signal is also an output signal to the device(s):

PAL 28 to PAL 30

GMK**—Bus Acknowledge or Grant Signal—When enabled, the instant device has mastership of the bus 14.

CM**—Current Master—When enabled, this signal indicates that the instant device is the current master of the arbitration process.

FL**—Fairness Lock—When enabled, this signal indicates that the instant device must wait for a fairness release cycle before it can make another bus request.

FC—First Cycle—When enabled, this signal indicates that the first half of the six-state arbitration process is in progress (operation numbers 1, 2 and 3).

SC—Second Cycle—When enabled, this signal indicates that the second half of the six-state arbitration process is in progress (operation numbers 4, 5 and 6).

PAL 30 to PAL 28

GSET—Grant Set—When enabled, this signal sets or enables the GMK bus grant signal.

ENRES-R—Enable Resolver Reset—When enabled, this signal disables the ENRES enable resolver signal.

Winner—This signal enabled indicates that the instant device is the winner of the priority competition.

C**—This signal is sent to the bus transceivers by the PAL 30 as the ac signal to be regenerated as the AC* bus signal.

PAL 30

NOCM—This signal is used internally in the PAL 30 and signals that there is no current master on the bus 14.

At an appropriate time in the protocol, the control logic 26 enables the priority resolver 24, and responsive to the timer circuit 32, waits a predetermined time for the resolver 24 to settle. The priority resolver 24, a PAL, incorporates a combinatorial logic circuit, i.e., one having no feedback paths, so that the number on the arbitration lines ANO*-AN5* depends only on the signals currently being applied, and not on any past history, to determine which device has the highest arbitration number. The priority resolver 24 has the the following input signals:

AA0-AA5—The ANO*-AN5* bus signals regenerated by the bus transceivers 22.

GA0-GA4—The predetermined arbitration number of the instant device.

ENRES—Enable Resolver—When asserted by the control logic 26, this signal enables the resolver output signals BO0-BO5 to the bus 14 via the bus transceivers 22.

ATEST—Arbitration Test—Enables diagnostic testing of the resolver 24 circuits.

The input signals of the arbitration resolver 24 are decoded into output signals in accordance with equations programmed into the PAL. The logic structure of the output signals is disclosed below in the form of Boolean logic equations. In the equations, a " + " symbol denoes an OR function, and a "*" symbol indicates an AND function. A "/" symbol prefix of a logic name means that the signal is the complement of the named signal (positive logic is utilized), i.e., "/" means that the voltage level associated with the term is the less positive level, and the term is enabled or high when that level is present on the signal node. For example, the ZERO signal is enabled when the /ZERO signal node is at the less-positive level, and disabled when the /ZERO node is at the more positive level. A logic term without a suffix symbol indicates that the voltage level associated with the term is the more positive level and the term is enabled or high when that level is present on the signal node. The logic terms correspond with the logic signal names utilized throughout the present specification; lower case characters are not used in the logic terms.

/ZERO = (/ATEST * /AA5 * /AA4 * /AA3 * /AA2 * /AA1 * /AA0) + (/ENRES * ATEST * BO0 * BO1 * BO2 * BO3 * BO4 * AA5 * AA4 * AA3 * AA2 * AA1 * AA0)

/EQUAL = ENRES + (HIGHP * AA5) + (/GA4 * AA4) + (/GA3 * AA3) + (/GA2 * AA2) + (/GA1 * AA1) + (/GA0 * AA0)

/BO0 = ENRES + (/GA0 * /ATEST) + (HIGHP * AA5 * /ATEST) + (/GA4 * AA4 * /ATEST) + (/GA3 * AA3 * /ATEST) + (/GA2 * AA2 * /ATEST) + (/GA1 * AA1 * /ATEST)

/BO1 = ENRES + (GA1 * /ATEST) + (/HIGHP * AA5 * /ATEST) + (/GA4 * AA4 * /ATEST) + (/GA3 * AA3 * /ATEST) + (/GA2 * AA2 * /ATEST)

/BO2 = ENRES + (/GA2 * /ATEST) + (/HIGHP * AA5 * /ATEST) + (/GA4 * AA4 * /ATEST) + (/GA3 * AA3 * /ATEST)

/BO3 = ENRES + (/GA3 * /ATEST) + (HIGHP * AA5 * /ATEST) + (/GA4 * AA4 * /ATEST)

/BO4 = ENRES + (/GA4 * /ATEST) + (/HIGHP * AA5 * /ATEST)

/BO5 = ENRES + (/HIGHP * /ATEST)

For the purpose of the ensuing discussion describing the contention resolution phase of an arbitration cycle, a lower case signal name denotes a signal sent by the device to the bus transceiver circuits 22 and onto the bus 14; an upper case signal name denotes the signal as received by the device from the bus transceiver circuits, and reflects what actually occurs due to the wired-OR configuration of the bus 14. This convention eliminates the confusion attendant the change of signal names that occurs, for example, at the bus transceivers 22, where the AN*(n) signals input to the resolver become the AA(n) signals and the BO(n) output signals from the resoler become the AN*(n) signals on the bus 14.

The wired-OR configuration of the bus allows the competing devices to determine which of them has the highest arbitration number. When the arbitration control logic 26 signals for competition (ENRES enabled), each device places its unique arbitration number on the AN0*-AN4* lines of the bus. After this instant, if any digit an(n) has a value 0 while the digit AN(n) on the corresponding bus line is 1, then all the digits of lower significance, an(n−1) to an0, are disabled by the priority resolver 24. After a time delay Tarb for the system to settle, the device winning the competition will still be asserting its AN* lines and losing devices will have disabled one or more of their AN* lines.

When the arbitration process settles out in the resolver 24 with the instant device as the arbitration winner, the resolver 24 enables the EQUAL signal that is coupled to the control logic 26, indicating that the arbitration number of the present device is asserted on the AN0*-AN5* lines of the bus 14. When the AA0-AA4 signals are disabled, the resolver 24 enables the ZERO signal which is coupled to the control logic as an indication that the arbitration number on the bus 14 is zero. The BO0-BO5 (an(n) output signals of the resolver 24 are inverted in the bus transceivers 22 and regenerated on the bus 14 as the AN0-AN5* signals.

Control Synchronization

The control synchronization process which synchronizes the operation of the asynchronous devices connected to the bus 14 is performed collectively by the control logic 26 in each of the devices, implemented as PALs 28, 30. The PALs 28, 30 are disclosed below in the form of Boolean logic equations utilizing the same conventions as previously described with reference to the priority resolver 24 PAL.

First PAL 28

/HOVR = (APF * /AQF * /ARF * SC * /AC)

/ENRES = (APF * AQF * /ARF * SC * CM * /ZERO * BRST) + (APF * /AQF * /ARF * SC * CM * AC * BRST) + (/APF * /AQF * ARF * /SC * /CM * C * /LOCK * BRST) + (/ENRES * ENRES-R * APF * BRST) + (/ENRES * ENRES-R * AQF * BRST) + (/ENRES * ENRES-R * SC * BRST) + (ENRES * ENRES-R * /LOCK * BRST)

/CM = /BRST + (APF * /AQF * SC * WINNER * /AC * ZERO) + (/CM * AQF) + (/CM * ARF) + (/CM * /SC * BRST) + (/CM * WINNER) + (/CM * AC)

/FC = /BRST + (/APF * /AQF * ARF * SC) + (/FC * AQF) + (/FC * AQF) + (/FC * SC) + (/FC * /AC)

/SC = /BRST + (/APF * /AQF * ARF * SC) + (/SC * APF) + (/SC * /AQF) + (/SC * ARF) + (/SC * /FC * BRST)

/FL = /BRST + (/APF * /AQF * ARF * /SC * /AC * BRST) + (/FL * GSET) + (/FL * HIGHP) + (/FL * LOCK)

/GMK = /BRST + /GMT + (/GMK * GSET) + (/GMK * LOCK)

/ENCT = /FC

Second PAL 30

/ENRES-R = /BRST + (/APF * /AQF * ARF * /SC * AC * /C) + (/APF * /AQF * ARF * /SC * CM * C) + (APF * /AQF * /ARF * SC1 * CM * WINNER * /AC) + (APF * /AQF * /ARF * SC * /CM * AC) + (APF * /AQF * /ARF * SC * /CM * WINNER)

/NCOM = /BRST + (/APF * AQF * /ARF * /FC * /ZERO) + (APF * /NOCM) + (/AQF * /NOCM) + (ARF * /NOCM) + (FC * /NOCM) + /ZERO * /NOCM)

/C = /BRST + (ARF * SC) + (/C * GREQ) + (/C * FC) + (/C * FL) + (/C * /AQF) + (/C * /R)

/WINNER = (/APF * /AQF * ARF * SC * EQUAL * BRST) + (AQF * WINNER * BRST) + (AQF * /WINNER * BRST) + (/ARF * /WINNER * BRST) + (/SC * /WINNER * BRST) +(EQUAL * /WINNER * BRST)

/P = /BRST + (/APF * /AQF * ARF * /SC) + (/APF * /AQF * ARF * SC * /GMK) + (/P * /FC * APF * /FL * /C) + (/P * /AQF) + (/P * /FC * APF * GREQ * /C * /CM)

/Q = /BRST + (APF * /AQF * /ARF * /SC) + (APF * /AQF * /ARF * SC * WINNER) + (APF * /AQF * /ARF * SC * /WINNER * /AC * GREQ) + (/Q * /ARF) + (/Q * SC * AQF * NOMC * /CM) + (/Q * SC * AQF * NOMC * GMK)

-continued

/R = (/APF * AQF * /ARF * /FC) + (/APF * AQF *
    /ARF * FC * /CM * /C) + (/APF * AQF * /ARF *
    FC * /CM * /RF) + (/APF * AQF * /ARF * FC *
    /C * /RP) + (/R * BRST * /APF)

/GSET = (/APF * /AQF * ARF * /SC * C * CM) +
    (APF * /AQF * /ARF * SC * WINNER * /AC)

Figure 4:
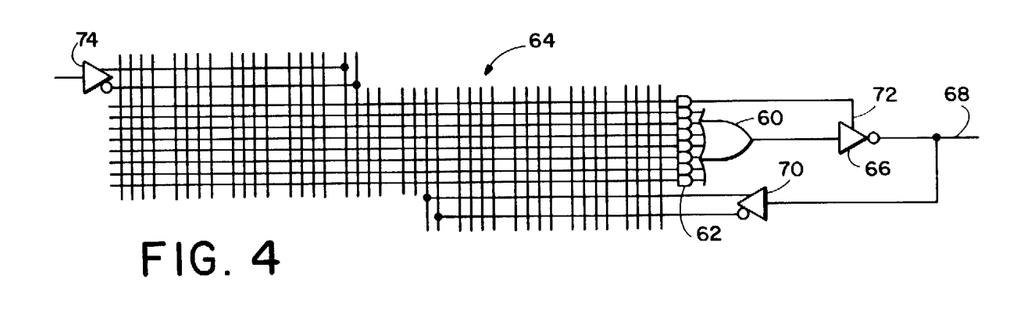
FIG. 4 is a schematic diagram of a programmable array logic circuit.

In the present invention, the PALs 24, 30, and 32 are Model 20L8A programmable array logic circuits manufactured by Monolithic Memories Inc. Referring to FIG. 4, a PAL circuit is illustrated in part, comprising an OR gate 60 provided with a number of inputs by way of drivers 62 from horiizontal conductors of a matrix 64, with the OR gate 60 driving a tri-state amplifier-inverter 66. An output 68 of the amplifier-inverter 66 is coupled through an amplifier 70 to provide both feedback and inverted feedback signals to vertical conductors of the matrix 64. The amplifier-inverter 66 may be tri-stated (opened) by an enabling input 72. The array depicted in FIG. 4 is repeated for each desired output signal on successive output leads such as the lead 68. The vertical lines of the matrix 64 represent conductors crossing over but not connected to the horizontal conductors, and carry input signals from successive input amplifiers such as amplifier 74 as well as feedback signals from succesive feedback amplifiers such as the amplifier 70. To implement the logic previously disclosed as Boolean expressions in the PAL, connections are enabled at appropriate crossovers of the horizontal and vertical conductors.

Figure 5:
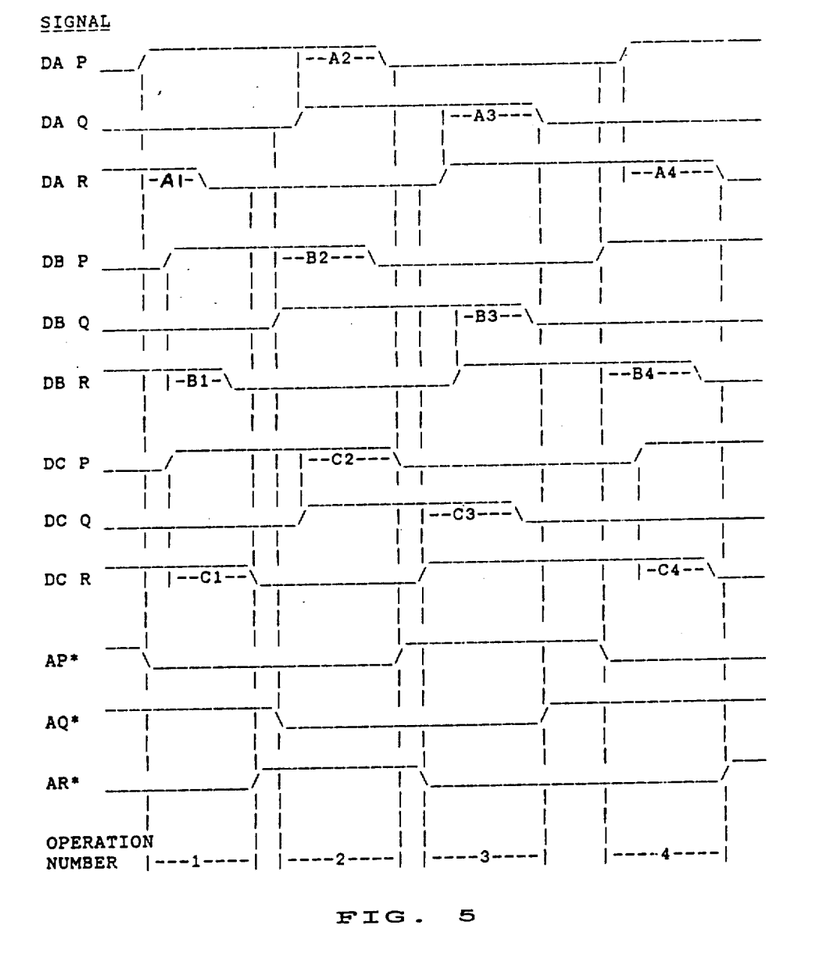
FIG. 5 is a signal timing diagram illustrating synchronization of devices.

Referring now to FIG. 5, the first four operations of the control synchronization process among three devices DA, DB, and DC are shown. Each device participating in the handshake operation controls its own variable signals P, Q, and R.

The signals on the AP*, AQ* and AR* bus lines are used to form a distributed state machine among the devices participating in arbitration. Initially, the P, Q, and R signals in every device are set to the values 0, 0, 1 respectively. Device A (DA) starts the sequence of operations by enabling the variable P, causing the bus line AP* to be enabled (less positive level). DA concurrently starts a first operation, as indicated in FIG. 5 by the designation -A1-, device A performing operation number 1. The remaining devices DB and DC sense the AP* bus line enabled, and respond by enabling their respective P signals and starting their own first operation B1, C1. When each device completes the first operation, the respective R signals in each device are disabled, and only when the slowest device, in this instance DC, has disabled its R signal, does the AR* bus line switch to zero (more positive level). All devices DA, DB, and DC respond to the AR* line changing state by enabling signal Q and starting a second operation, respectively A2, B2, C2. As each device completes the second operation, the signal P is disabled, and when the slowest device, in this instance DC, disables its P signal, the AP* bus line switches to O. All devices, DA, DB, and DC respond to the AP* signal changing state by enabling the Q signal and starting a third operation, respectively A3, B3, and C3. When each device completes the third operation, the respective Q signal is disabled, and only when the slowest device, in this instance DA, has disabled its Q signal, does the AQ* line switch to zero. If a fourth operation is called for by enabling the SC signal (second cycle), then all devices respond to the AQ line changing state by enabling the P signal once again and starting a fourth operation. Operations 4, 5, and 6 are synchronized similarly as described above with reference to operation numbers 1, 2, and 3.

Control Procedures

Any PM device connected to the bus 14 may initiate an arbitration procedure to access the bus or to acquire release from the fairness restriction by enabling the bus request signal GREQ. Prior to beginning an arbitration procedure, a device having a requirement for bus arbitration enables the C signal on the lead 36 in response to the GREQ signal; however, if the device is inhibited by the fairness restriction, the C signal is inhibited. All other devices disable the C signal. An arbitration procedure comprises a series of numbered operations or states, listed below, that are started and completed as described above with reference to the control synchronization process.

Operation 1

All devices lock the variable C signal at the current value, and detect whether or not a current master has control of the bus. The absence of a current master is indicated during operation 1 by enabling the NOCM signal in response to the AN0*-AN4 bus lines being disabled (signal ZERO enabled).

Operation 2

All devices evaluate the AC* line. If the AC* line is disabled, all devices register that a fairness release procedure has been initiated (C signal disabled) and that the procedure shall terminate at the end of operation number 3. Devices inhibited for making bus requests under the fairness restriction disable the restriction at the end of operation 3 by disabling the FL signal; such devices can then enable bus requests after operation 3 is completed.

If the AC* line is enabled, then all devices register that the procedure is a call for arbitration, and that the procedure shall terminate at the end of operation number 6. All competing devices activate the AN* lines with their respective arbitration numbers, and enable the contention resolution logic as previously described with reference to FIG. 2. If a device which is the current master is not competing for the bus, the non-competing device removes its arbitration number from the AN* lines. The current master and all competing devices each begin timing the interval Tarb in accordance with their own logic circuits, wherein:
Tarb = 2*TpRT + TsMax + 7*Max[Td,
    Tek(0 ≦ = k ≦ = 4), Tf]

and where
Ts is the delay introduced by the AR* line integrator of the integrator and theshold circuits 38;
Td is the time from the integrator output switching to 0, and the activation of the AN5* line;
Tek(0 ≦ = k ≦ = 4) is the time from an externally produced change on bus line AN(k+1)*, and the resulting change on line AN(k)*;
Tf is the time from an externally produced change on bus lines AN0*-AN4* to the resulting change on the line indicating a win or loss of the arbitration cycle;
TsMax is the maximum value of Ts;
Max[ ] is the largest value among Td, all the Tek, and Tf in the device logic; and TpRT is the round trip bus propagation delay, from one end of the unitary bus 14 to the other end of the bus, and return.

Operation 3

No new action is initiated during this operation other than moving to the next operation. The fairness procedure concludes with this operation.

Operation 4

Each device that initiated timing Tarb in operation 2 waits in this state until Tarb times out. Prior to the start of operation 5, if a device has error detection logic, then the device carries out the error checks, and any device detecting an error enables the C signal. Devices not detecting an error, and devices without error detection logic, disable the C signal. A priority device with a higher arbitration number than the value on the AN* lines enables the C signal if it wishes to force a rearbitration cycle. Devices can, record the identity of the next bus master by storing the contents of the AN* lines. When there is no current master as determined in operation 2, then the all the devices participating in arbitration initiate operation 5. If a current master device exits, then that device initiates operation 5 when it is ready to release the bus to another master device.

Operation 5

All devices complete the procedures started above; all devices lock their variable C signal (rearbitrate) at its current value.

Operation 6

All devices evaluate the bus line AC*. If the AC* line is 0, then all devices, in response to the HOVR handover signal enabled, cancel any interlocks left by the parallel protocol, and the mastership of the bus transfers from the current master to the PM device having the arbitration number which appeared on the AN* lines during operation 5. One example of such an interlock is one imposed by a first central processing unit on a second cental processing unit when both are performing read-modify-write operations on a common data store segment. Devices losing the arbitration competition remove their arbitration number from the AN* lines.

If the AC* line is 1, then the current master places its arbitration number on the AN* lines and all other devices remove their arbitration numbers.

The bus arbitration controller of the present invention thus uses programmable logic array circuits to implement distributed arbitration logic in inexpensively fabricated microcircuit packages. The controller synchronizes the operation of a plurality of asynchronous potential master devices contending for access to the bus and awards the bus to the requesting device having the highest priority arbitration number.

While the principles of the invention have now been made clear in the foregoing illustrative embodiment, there will be immediately obvious to those skilled in the art many modifications of structure, arrangement, proportions, the elements, material and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

I claim:

1. In a computer system havig a unitary bus and at least two asynchronous devices each coupled through a respective bus transceiver unit to the unitary bus, and an arbitration controller distributed in the asynchronous devices resolving contention for access to the unitary bus by the asynchronous devices, the unitary bus having a plurality of control signal lines including a priority arbitration signal set AN0*-AN5*, an arbitration condition signal AC*, and a synchronization signal set AP*, AQ* and AR*, each of the control signal lines being common to each of the asynchronous devices and coupled to each said asynchronous device by wired-OR logic through the respective bus transceiver units, the synchronization control signal set being coupled through integrator and threshold circuit means for preventing wired-OR glitches, wherein the improvement comprises:

control logic means in each of one of the asynchronous devices for synchronizing the operation of the asynchronous devices by way of the unitary bus, the control logic means receiving control signals GREQ, BRST, GMT, HIGHP and LOCK from the one asynchronous device, the control signals AC*, AP*, AQ* and AR* from the unitary bus respectively as control signals AC, APF, AQF and ARF, and providing control signals GMK, HOVR, FL and CM to the one asynchronous device, the control logic means providing an arbitration condition signal C and a synchronization control signal set P, Q and R each coupled respectively through the bus transceiver unit to the control signal lines AC*, AP*, AQ* and AR* of the unitary bus;

means in each one of the asynchronous devices coupled to the control logic means for resolving priority among the plurality of devices for access to the unitary bus, the priority resolving means receiving priority signals GA0-GA4 and the HIGHP control signal from the one asynchronous device, the control signals AN0*-AN5* from the unitary bus respectively as control signals AA0-AA5, and providing a control signal ZERO to the one asynchronous device, the priority resolving means providing a priority arbitration signal set BO0-BO5 coupled respectively through the bus transceiver unit to the control signal lines AN0*-AN5* of the unitary bus;

means in each one of the asynchronous devices receiving a first timing signal from the one asynchronous device and a second timing signal ENCT from the control logic means and providing a timing signal RP for timing the operation of the control logic means;

the control logic means comprising combinatorial logic

/HOVR = (APF * /AQF * /ARF * SC * /AC)

/ENRES =
  (APF * AQF * /ARF * SC * CM * /ZERO * BRST) +
  (APF * /AQF * /ARF * SC * CM * AC * BRST) +
  (/APF * /AQF * ARF * /SC * /CM * C * /LOCK * BRST) +
       (/ENRES * ENRES-R * APF * BRST) +
       (/ENRES * ENRES-R * AQF * BRST) +
         (/ENRES * ENRES-R * SC * BRST) +
                 (ENRES * ENRES-R * /LOCK * BRST)

/CM =
  /BRST + (APF * /AQF * SC * WINNER * /AC * ZERO) +
  (/CM * AQF) + (/CM * ARF) + (/CM * /SC * BRST) +

-continued (/CM * WINNER) + (/CM * AC)

/FC =
  /BRST + (/APF * /AQF * ARF * SC) * (/FC * AQF) +
    (/FC * AQF) + (/FC * SC) + (/FC * AC)

/SC =
  /BRST + (/APF * /AQF * ARF * SC) * (/SC * APF) +
    (/SC * AQF) + (/SC * ARF) + (/SC * /FC * BRST)

/FL =
  /BRST + (/APF * /AQF * ARF * /SC * /AC * BRST) +
    (/FL * GSET) + (/FL * HIGHP) + (/FL * LOCK)

/GMK =
  /BRST + /GMT + (/GMK * GSET) + (/GMK * LOCK)

/ENCT = /FC

/ENRES-R =
  /BRST + (/APF * /AQF * ARF * /SC * AC * /C) +
    (/APF * /AQF * ARF * /SC * CM * C) +
    (APF * /AQF * ARF * SC1 * CM * WINNER * /AC) +
    (APF * /AQF * /ARF * SC * /CM * AC) +
    (APF * /AQF * /ARF * SC * /CM * WINNER)

/NOCM =
  /BRST + (/APF * AQF* /ARF * /FC * /ZERO) +
    (APF * /NOCM) + (/AQF * /NOCM) + (ARF * /NOCM) +
    (FC * /NOCM) + /ZERO * /NOCM)

/C = /BRST + (ARF * SC) + (/C * GREQ) + (/C * FC) +
    (/C * FL) + (/C * /AQF) + (/C * /R)

/WINNER =
  (/APF * /AQF * ARF * SC * EQUAL * BRST) +
    (AQF * WINNER * BRST) + (AQF * /WINNER * BRST) +
    (/ARF * /WINNER * BRST) + (/SC * /WINNER * BRST) +
    (EQUAL * /WINNER * BRST)

/P = /BRST + (/APF * /AQF * ARF * /SC) +
    (/APF * /AQF * ARF * SC * /GMK) +
    (/P * /FC * APF * /FL * /C) + (/P * /AQF) +
    (/P * /FC * APF * GREQ * /C * /CM)

/Q = /BRST + (APF * /AQF * ARF * /SC) +
    (APF * /AQF * /ARF * SC * WINNER) +
    (APF * /AQF * /ARF * SC * /WINNER * /AC * GREQ) +
    (/Q * /ARF) + (/Q * SC * AQF * NOMC * /CM) +
    (/Q * SC * AQF * NOMC * GMK)

/R = (/APF * AQF * /ARF * /FC)
    (/APF * AQF * /ARF * FC * /CM * /C) +
    (/APF * AQF * /ARF * FC * /CM * /RP) +
    (/APF * AQF * /ARF * FC * /C * /RP) +
    (/R * BRST * /APF)

/GSET = (/APF * /AQF * ARF * /SC * C * CM) +
    (APF * /AQF * /ARF * SC * WINNER * /AC);
the priority resolving means comprising combinatorial logic /ZERO =
  (/ATEST * /AA5 * /AA4 * /AA3 * /AA2 * /AA1 * /AA0) +
    (/ENRES * ATEST * BO0 * BO1 * BO2 * BO3 * BO4 *
      AA5 * AA4 * AA3 * AA2 * AA1 * AA0)

/EQUAL = ENRES + (HIGHP * AA5) + (/GA4 * AA4) +
    (/GA3 * AA3 * (/GA2 * AA2) + (/GA1 * AA1) +
      (/GA0 * AA0)

/BO0 =
  ENRES + (/GA0 * /ATEST) + (HIGHP * AA5 * /ATEST) +
    (/GA4 * AA4 * /ATEST) + (/GA3 * AA3 * /ATEST) +
    (/GA2 * AA2 * /ATEST) + (/GA1 * AA1 * /ATEST)

/BO1 =
  ENRES + (GA1 * /ATEST) + (/HIGHP * AA5 * /ATEST) +
    (/GA4 * AA4 * /ATEST) + (/GA3 * AA3 * /ATEST) +
    (/GA2 * AA2 * /ATEST)

/BO2 =
  ENRES + (/GA2 * /ATEST) + (/HIGHP * AA5 * /ATEST) +
    (/GA4 * AA4 * /ATEST) + (/GA3 * AA3 * /ATEST)

/BO3 =
  ENRES + (/GA3 * /ATEST) + (/HIGHP * AA5 * /ATEST) +
    (/GA4 * AA4 * /ATEST)

/BO4 =
  ENRES + (/GA4 * /ATEST) + (/HIGHP * AA5 * /ATEST)

/BO5 = ENRES + (/HIGHP * /ATEST).

2. The computer system of claim 1, wherein said priority resolving means comprises a programmable array logic circuit.

3. The computer system of claim 1, wherein said control logic means comprises a programmable array logic circuit.

* * * * *